US006944429B1

(12) United States Patent
Kitamura et al.

(10) Patent No.: US 6,944,429 B1
(45) Date of Patent: Sep. 13, 2005

(54) PORTABLE TERMINAL DEVICE

(75) Inventors: Toshiyasu Kitamura, Kanagawa (JP); Nobutoshi Hamada, Kanagawa (JP); Katsuhisa Furukawa, Shizuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 383 days.

(21) Appl. No.: 09/694,696

(22) Filed: Oct. 23, 2000

(30) Foreign Application Priority Data

Oct. 26, 1999 (JP) .............................. P.11-304593

(51) Int. Cl.[7] ......................... H04B 1/38; H04B 1/034; H04M 1/00; H01Q 1/26; H01Q 1/10

(52) U.S. Cl. ..................... 455/90.3; 455/550; 455/575; 455/97; 343/901; 343/702

(58) Field of Search .......................... 455/90, 550, 575, 455/97, 90.3; 343/901, 702

(56) References Cited

U.S. PATENT DOCUMENTS

| | | | | |
|---|---|---|---|---|
| 5,243,355 A | | 9/1993 | Emmert et al. | |
| 5,389,938 A | * | 2/1995 | Harrison | 343/702 |
| 5,434,582 A | * | 7/1995 | Koike et al. | 343/702 |
| 5,438,482 A | | 8/1995 | Nakamura et al. | |
| 6,211,829 B1 | * | 4/2001 | Saldell et al. | 343/702 |
| 6,326,933 B1 | * | 12/2001 | Patachi | 343/901 |

FOREIGN PATENT DOCUMENTS

| | | | | |
|---|---|---|---|---|
| EP | 0 942 487 A1 | | 9/1999 | |
| JP | 7-321525 | | 12/1995 | |
| JP | 7322339 | * | 12/1995 | H04B 7/26 |

OTHER PUBLICATIONS

Full Japanese to English translation of Sekine's reference in which has been provided from last office action.*

Patent Abstract of Japan Publication No. 07322339, "Portable Electronic Appliance Case", Aug. 12, 1995, 1 page.

* cited by examiner

*Primary Examiner*—Vivian Chin
*Assistant Examiner*—Yuwen Pan
(74) *Attorney, Agent, or Firm*—Pearne & Gordon LLP

(57) ABSTRACT

A gutter-like antenna tube storage part having a half cylindrical shape, is recessed downward from a flat part of a battery storage part, integrally with a rear case of a housing of a portable terminal device. Therefore, the section modulus of the rear case in terms of the strength of materials can be large, and thus deterioration of the rigidity can be prevented even in the case the device main body is made thinner.

24 Claims, 13 Drawing Sheets

PORTABLE TERMINAL DEVICE

BACKGROUND OF THE INVENTION

The present invention relates to a portable terminal device, in particular, it relates to that comprising a gutter-like antenna tube storage part in a rear case of a housing, with a rib provided along the antenna storage direction in the antenna tube storage part so as to increase the rigidity of the device main body as well as to improve the assembly property of the device.

As shown in FIG. 11, in conventional portable terminal devices, an antenna tube 37 is placed on a flat part 34*a* of a battery storage part 34 through a hole 33 provided in a rear case 32 of a housing so as to be interposed and fixed between an engaging rib 34*b* provided on the flat part 34*a* of the battery storage part 34 and an inner wall 34*c* of the rear case.

The state will be explained with reference to FIG. 12. The antenna tube 37 is stored in the rear case 32 of the housing, contacting with the side part of the battery storage part for storing a battery. A short engaging rib 34*b* is provided partially, projecting from the flat part 34*a* of the battery storage part 34*a* for positioning and fixing the antenna tube 37.

A conventional method for attaching and fixing an antenna will be explained with reference to an exploded perspective view of FIG. 13. Conventionally, in attaching and fixing an antenna, first, an antenna holder receiving tool 41 with the antenna tube 37 and an antenna terminal 40 coupled is prepared. After inserting the tip end of the antenna tube 37 through the hole 33 of the rear case 32, the antenna holder receiving tool 41 is pressured against the rear case 32 so as to be closely contacted and fixed. The tip end of the antenna tube 37 is interposed between the engaging rib 34*b* provided in the battery storage part and the inner wall 34*c* of the rear case so as to be fixed. Thereafter, an antenna main body 1 inserted through an antenna holder 2 is prepared. The tip end of the antenna main body 1 is inserted into the antenna tube 37 via the antenna inserting hole 7 of the rear case and the hole of the antenna receiving tool 41 so that the antenna holder is screwed and fixed into the antenna receiving tool 41.

Portable terminal devices such as portable phones and PHS (personal handy phone system) have been made smaller and lightweight year by year. These days, a thinner size has been a critical point to determine the merchandise value. However, a problem of weakness in terms of strength, such as decline of the rigidity of the device, arises in designing with a thinner shape while realizing a lighter weight of the device main body.

Moreover, since the antenna tube inserted through the hole provided in the rear case of the housing is placed on the flat part 34*a* of the battery storage part 34 so as to interpose the antenna tube 37 between the engaging rib 34*b* of the battery storage part and the inner wall 34*c* of the rear case in the above-mentioned conventional portable terminal device, a problem is involved in that the operativity and the assembly property are poor due to the operation of inserting the antenna tube from one surface of the rear case through the hole and gripping the same by the engaging rib 34*b* on the opposite side.

SUMMARY OF THE INVENTION

In order to solve the above-mentioned conventional problems, an object of the invention is to provide a portable terminal device capable of improving the assembly property of the device without the risk of deteriorating the rigidity while achieving a thinner shape of the device main body.

A first aspect of the invention is a portable terminal device with an antenna main body to be stored in an antenna tube in a housing in the case an antenna is contracted, wherein a gutter-like antenna tube storage part is provided in a battery storage part in a rear case of the housing so as to store the antenna main body in the antenna tube provided in the antenna tube storage part. According to the configuration, the section modulus of the rear case of the housing in terms of the strength of materials can be large, and thus deterioration of the rigidity can be prevented even in the case the device main body is made thinner.

A second aspect of the invention is the portable terminal device according to the first aspect, wherein a rib is provided along the antenna storage direction in the antenna tube storage part. According to the configuration, the section modulus of the rear case of the housing in terms of the strength of materials can further be large, and thus deterioration of the rigidity can be prevented even in the case the device main body is made thinner.

A third aspect of the invention is the portable terminal device according to the first or second aspect, wherein a protrusion part of the gutter-like antenna tube storage part is formed on the battery side in the battery storage part so as to store the antenna tube in a recess part of the antenna tube storage part formed on the opposite side with respect to the battery side. According to the configuration, since the operation of inserting the antenna tube through the hole provided in the housing can be eliminated at the time of assembly, the assembly property of the device can be improved. Moreover, since the hole for inserting through the antenna tube provided commonly in the conventional housing is eliminated, entrance of sweat or water from the battery storage part into the housing inside through the hole can be avoided so as to prevent adverse effects on the electronic parts.

A fourth aspect of the invention is the portable terminal device according to the third aspect, wherein the antenna tube is inserted through between the antenna tube storage part and a printed board. According to the configuration, deterioration of the rigidity can be prevented even in the case the device main body is made thinner as well as the assembly property of the device can be improved.

A fifth aspect of the invention is the portable terminal device according to any of the first to fourth aspects, wherein the antenna tube storage part is a half cylindrical gutter-like antenna tube storage part. According to the configuration, a shape capable of improving the rigidity can easily be formed as well as since the outer circumferential surface of the antenna tube can fit with the half cylindrical surface of the antenna tube storage part, storage and assembly can be facilitated.

DETAILED DESCRIPTION OF THE PREFERRED EMBODIMENTS

First Embodiment

Figure 1:
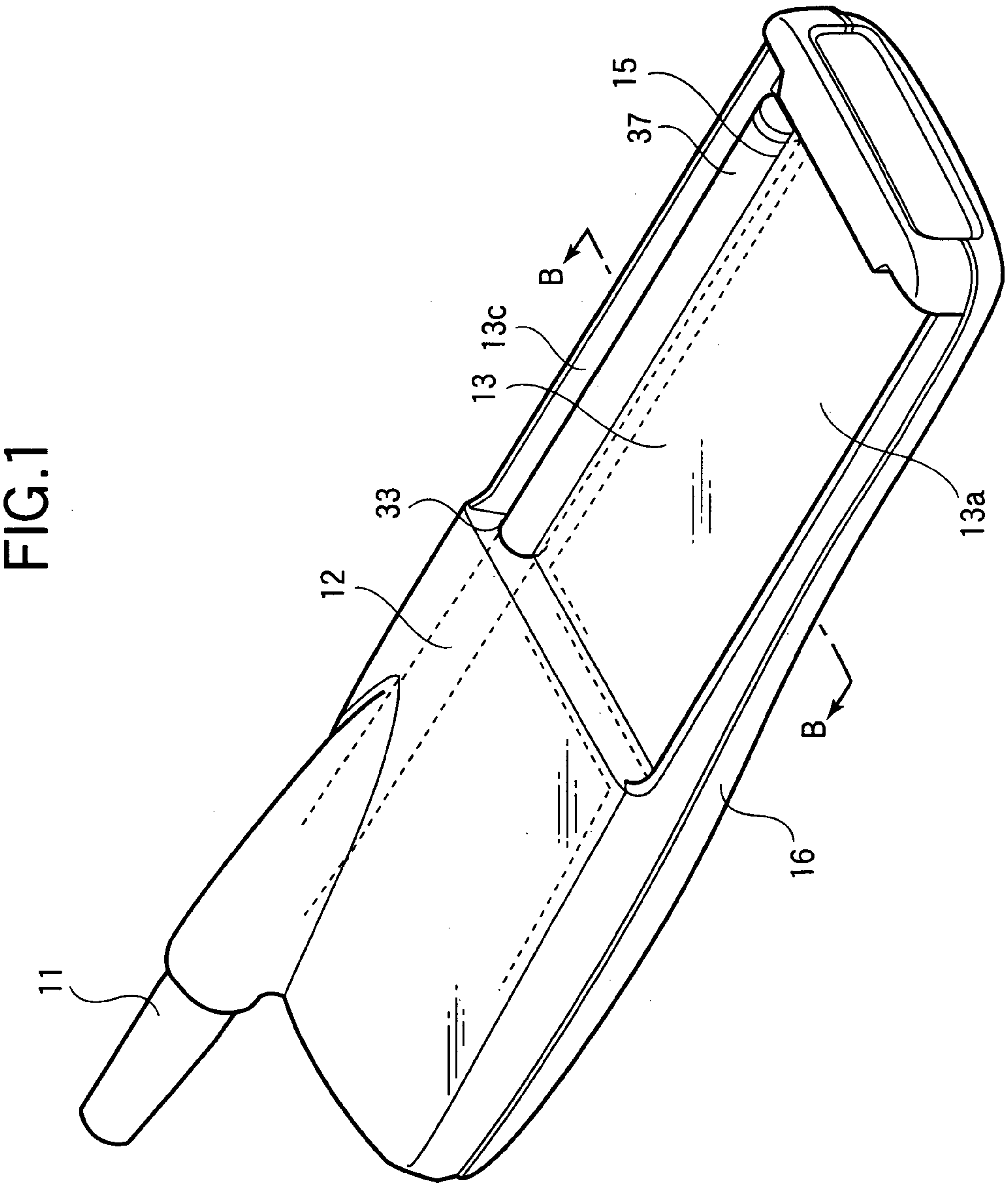
FIG. 1 is a perspective view showing the configuration of a portable phone device according to a first embodiment of the invention.

Hereinafter, a first embodiment of the invention will be explained with reference to FIGS. 1 and 2. FIG. 1 is a perspective view showing the configuration of a portable terminal device according to an embodiment of the invention, showing the portable terminal device with a battery detached, in the state with an antenna contracted so as to store an antenna main body 11 in a tube 37.

Figure 2:
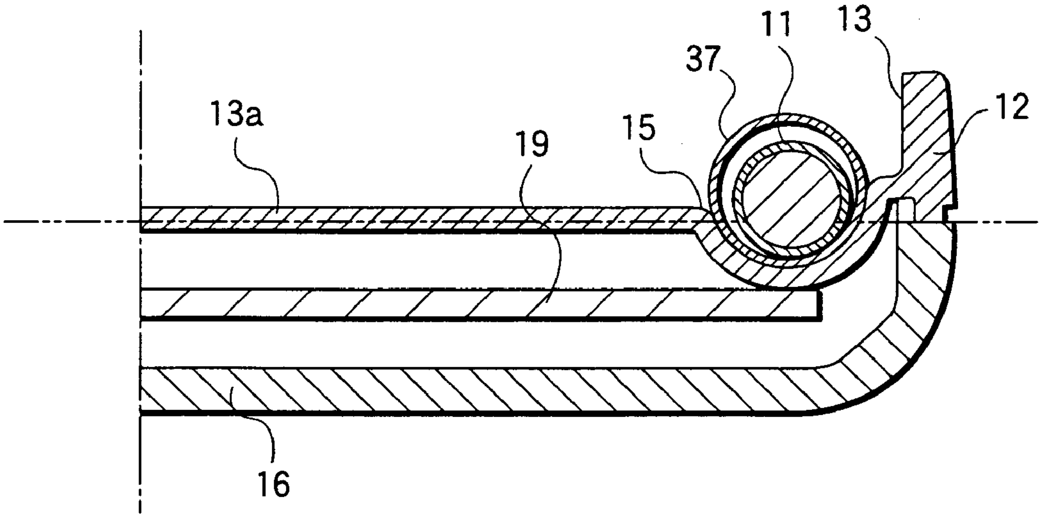
FIG. 2 is a cross-sectional view of the portable phone device according to the first embodiment of the invention.

FIG. 2 is a partial cross-sectional view taken on the line B—B of FIG. 1 on the antenna tube side. A gutter-like antenna tube storage part 15 having a half cylindrical shape, is recessed downward from a flat part 13*a* of a battery storage part 13, integrally with a rear case 12 of a housing of the portable terminal device. Therefore, the section modulus of the rear case in terms of the strength of materials can be large, and thus deterioration of the rigidity can be prevented even in the case the device main body is made thinner.

Figure 3:
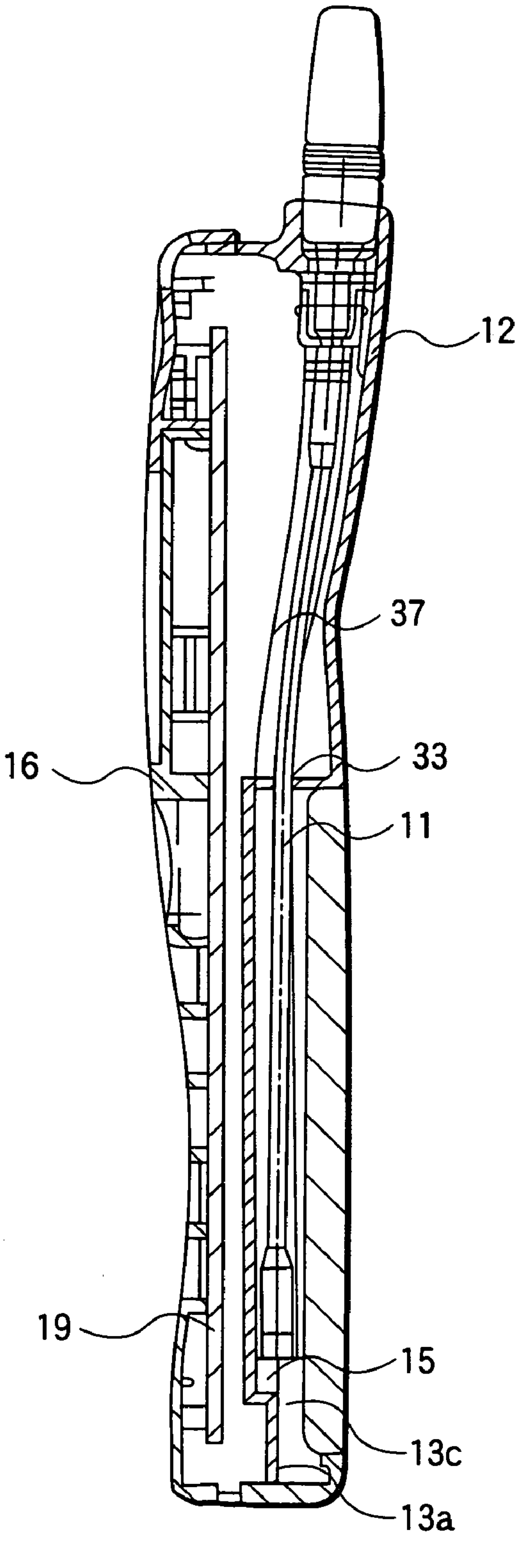
FIG. 3 is a cross-sectional view of the portable phone device according to the first embodiment of the invention.

As shown in a cross-sectional view in the axial direction of the antenna according to the first embodiment of the invention of FIG. 3, the axial direction of the antenna intersects obliquely with the flat part 13*a* of the battery storage part of the rear case 12. Accordingly, the antenna tube 37 is stored in the state pressured against the half cylindrical gutter-like antenna tube storage part 15. Therefore, unlike the conventional example, the engaging rib 34*b* can be eliminated so that the assembly operation of interposing the antenna tube 37 between the engaging rib 34*b* and the inner wall 34*c* of the rear case can be omitted, and thus the assembly property of the device can be improved.

Second Embodiment

Figure 4:
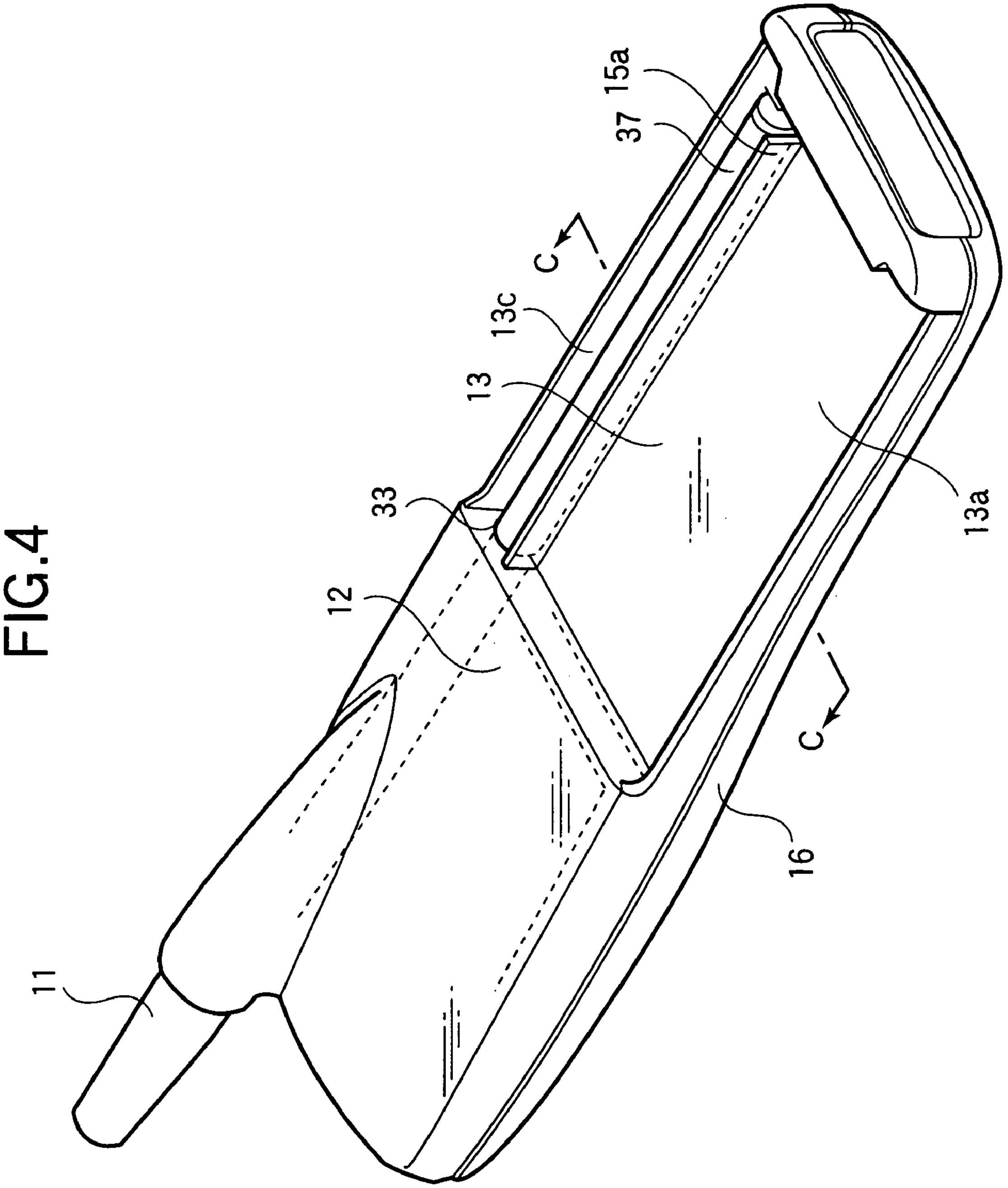
FIG. 4 is a perspective view showing the configuration of a portable phone device according to a second embodiment of the invention.
Figure 5:
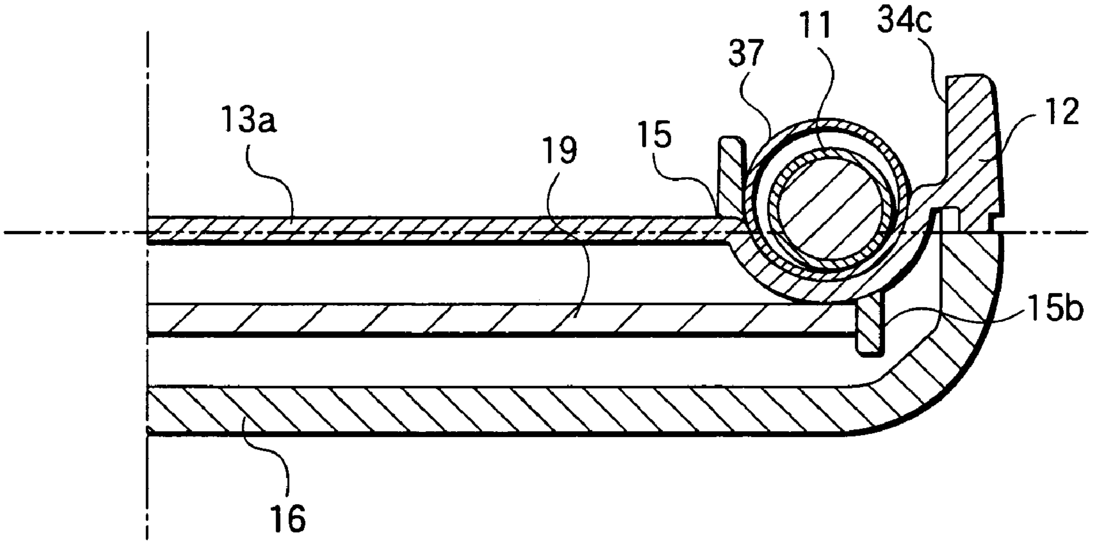
FIG. 5 is a cross-sectional view of the portable phone device according to the second embodiment of the invention.

A second embodiment of the invention will be explained with reference to FIGS. 4 and 5. FIG. 4 is a perspective view showing the configuration of a portable terminal device according to the second embodiment of the invention, and FIG. 5 is a cross-sectional view taken on the line C—C of FIG. 4. It differs from the first embodiment of the invention in that ribs 15*a*, 15*b* are formed additionally in the half cylindrical gutter-like antenna tube storage part 15 in the antenna storage direction. Accordingly, the rigidity of the device main body can further be improved as well as the antenna tube 37 can easily be stored in the antenna tube storage part 15 of the rear case and can hardly be detached from the antenna storage part 15 so as to improve the assembly property. The ribs 15*a*, 15*b* can be provided both or only one of them can be provided as well.

Third Embodiment

Figure 6:
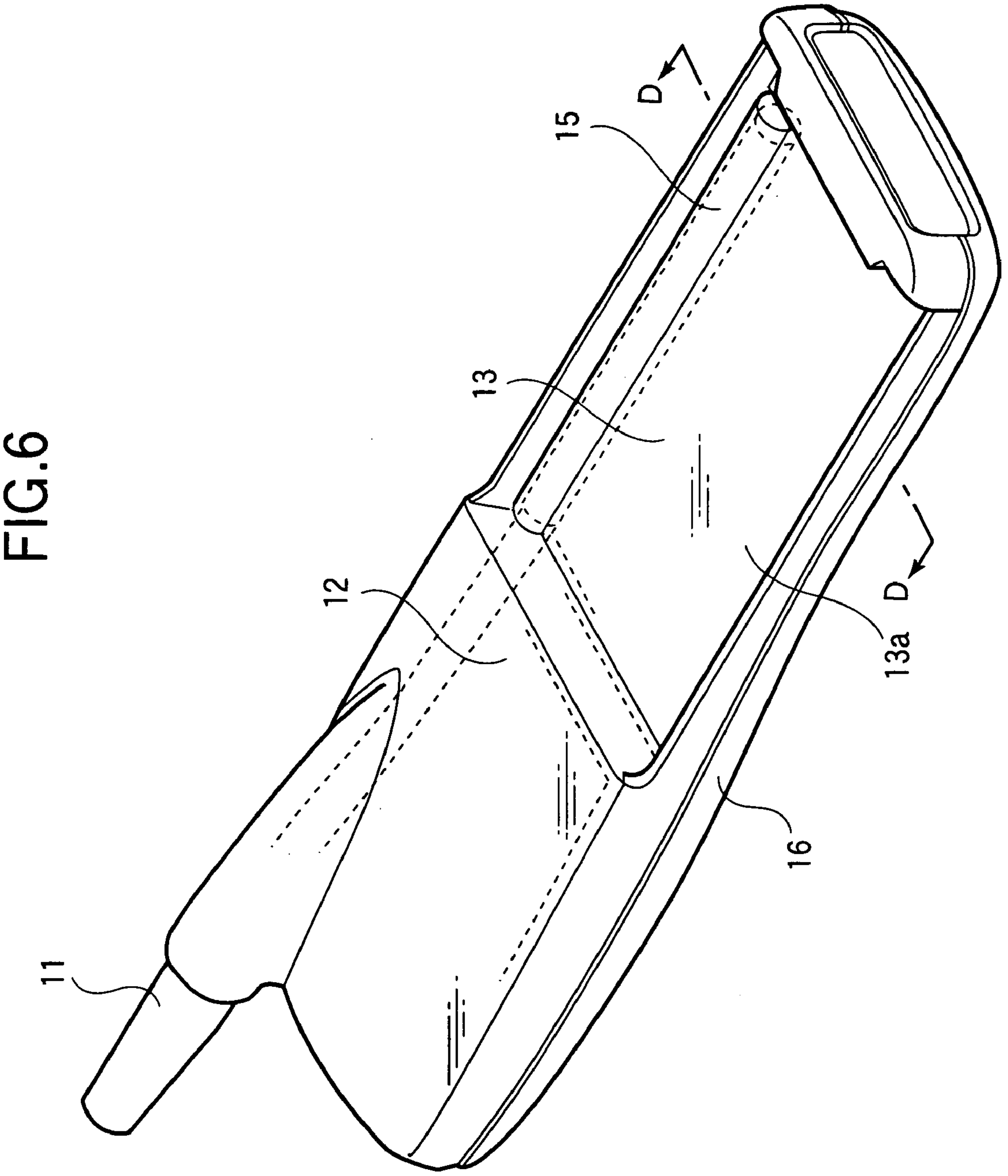
FIG. 6 is a perspective view showing the configuration of a portable phone device according to a third embodiment of the invention.
Figure 7:
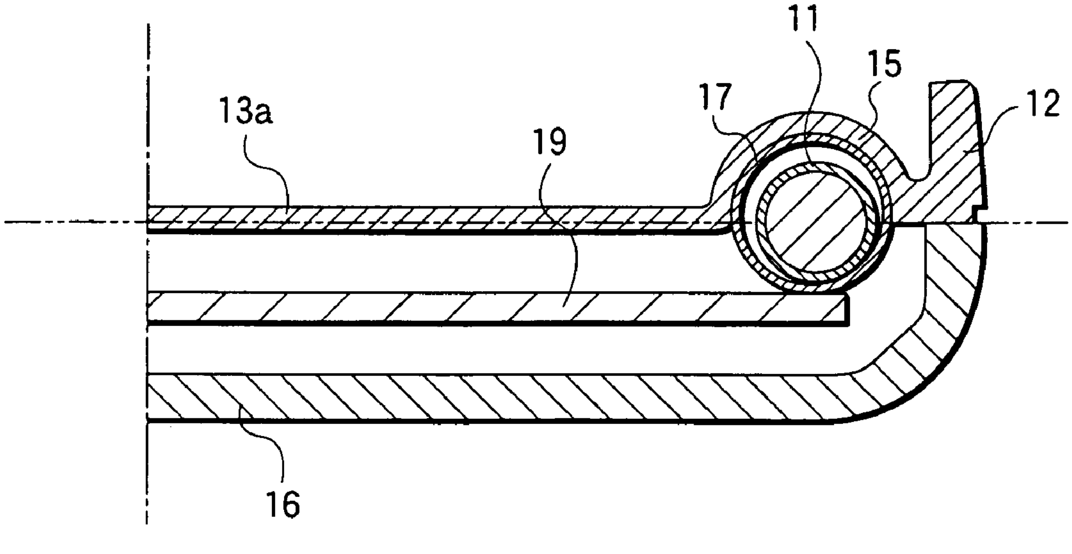
FIG. 7 is a cross-sectional view of the portable phone device according to the third embodiment of the invention.
Figure 8:
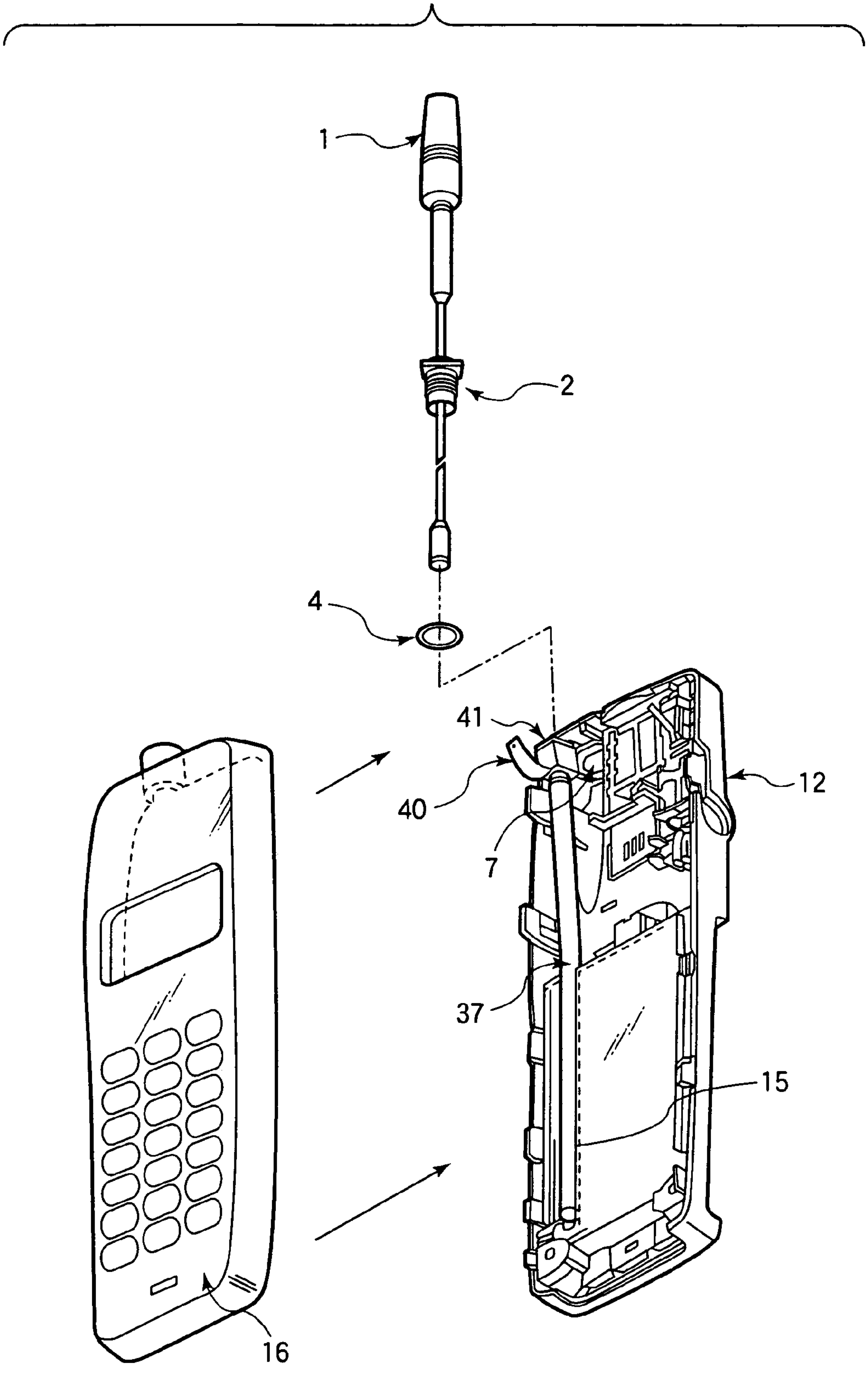
FIG. 8 is an exploded perspective view of the portable phone device according to the third embodiment of the invention.

A third embodiment of the invention will be explained with reference to FIGS. 6 and 7. FIG. 6 is a perspective view showing the configuration of a portable terminal device according to the third embodiment of the invention, and FIG. 7 is a cross-sectional view taken along the line D—D of FIG. 6. It differs from the first embodiment of the invention in that a protrusion part of the half cylindrical gutter-like antenna tube storage part 15 is formed on the battery side in the battery storage part, and the antenna tube 37 is stored in the recess part of the antenna tube storage part formed on the opposite side with respect to the battery side. As shown in an exploded perspective view of FIG. 8, since the antenna tube 37 can be stored on the same side as the antenna holder receiving part 41, unlike the conventional example, the antenna tube need not be inserted through the hole of the rear case of the housing so that the assembly property can be improved. The antenna tube 37 is fixed finally by being pressured by a printed board 19 attached on a front case 16.

Fourth Embodiment

Figure 9:
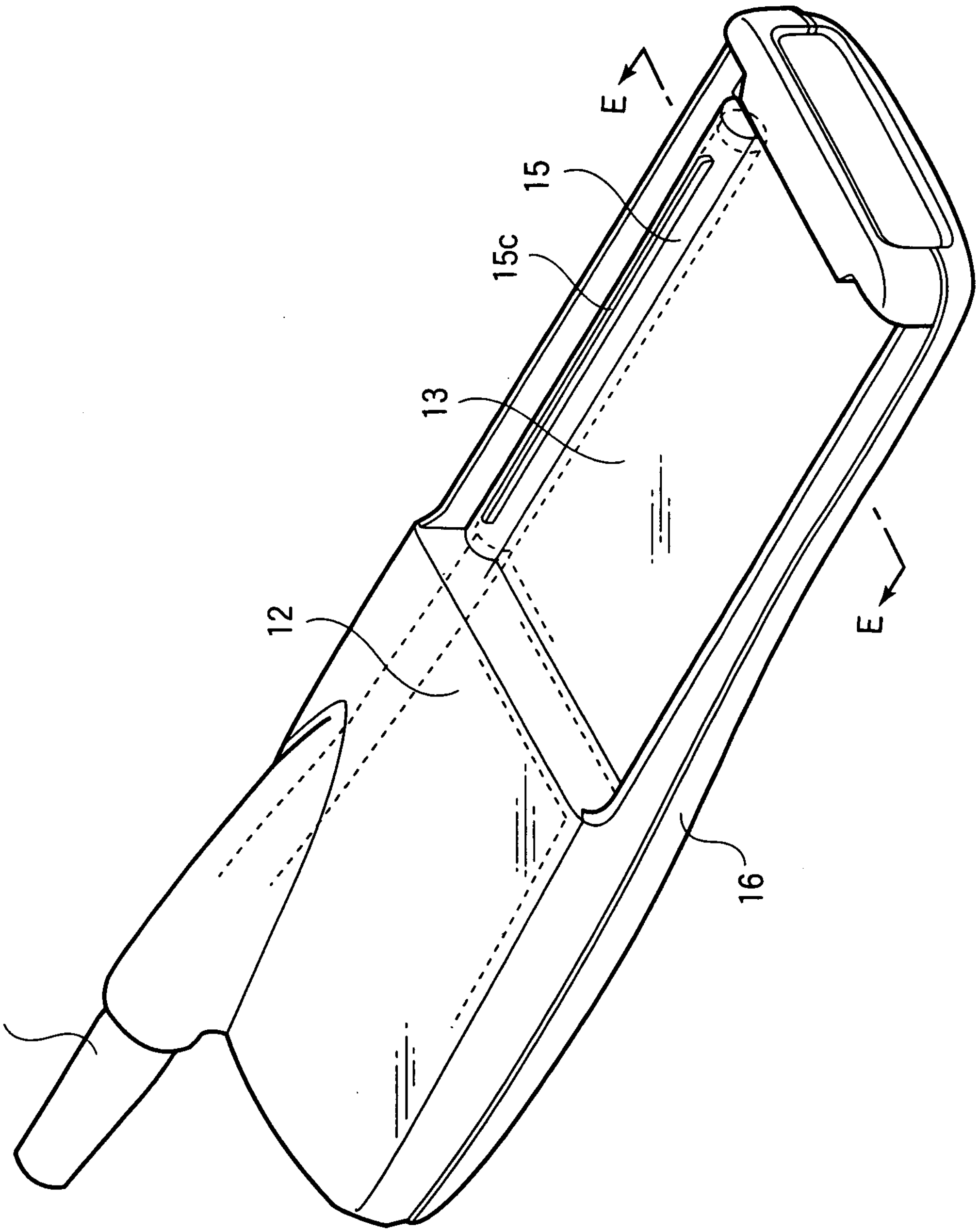
FIG. 9 is a perspective view showing the configuration of a portable phone device according to a fourth embodiment of the invention.
Figure 10:
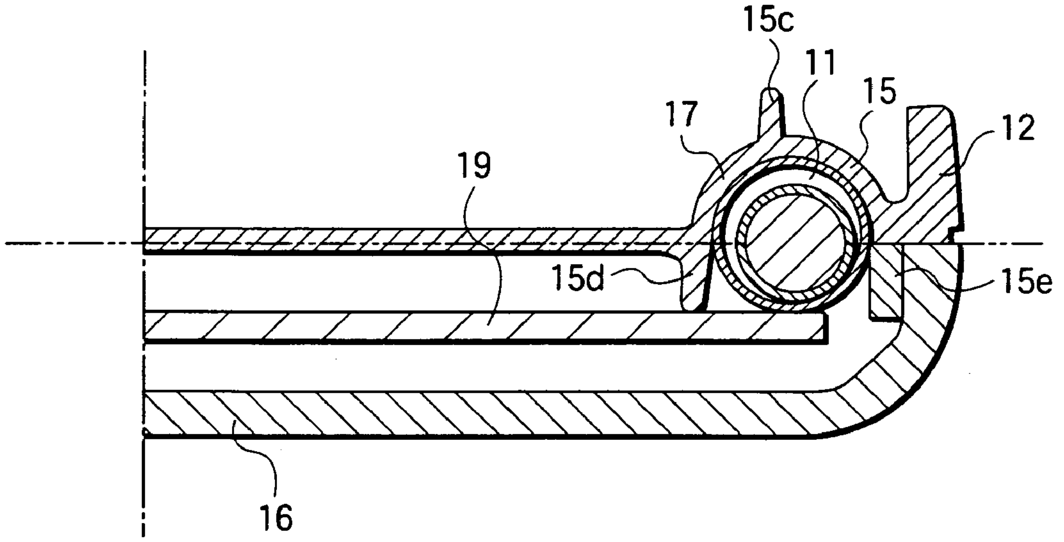
FIG. 10 is a cross-sectional view of the portable phone device according to the fourth embodiment of the invention.
Figure 11:
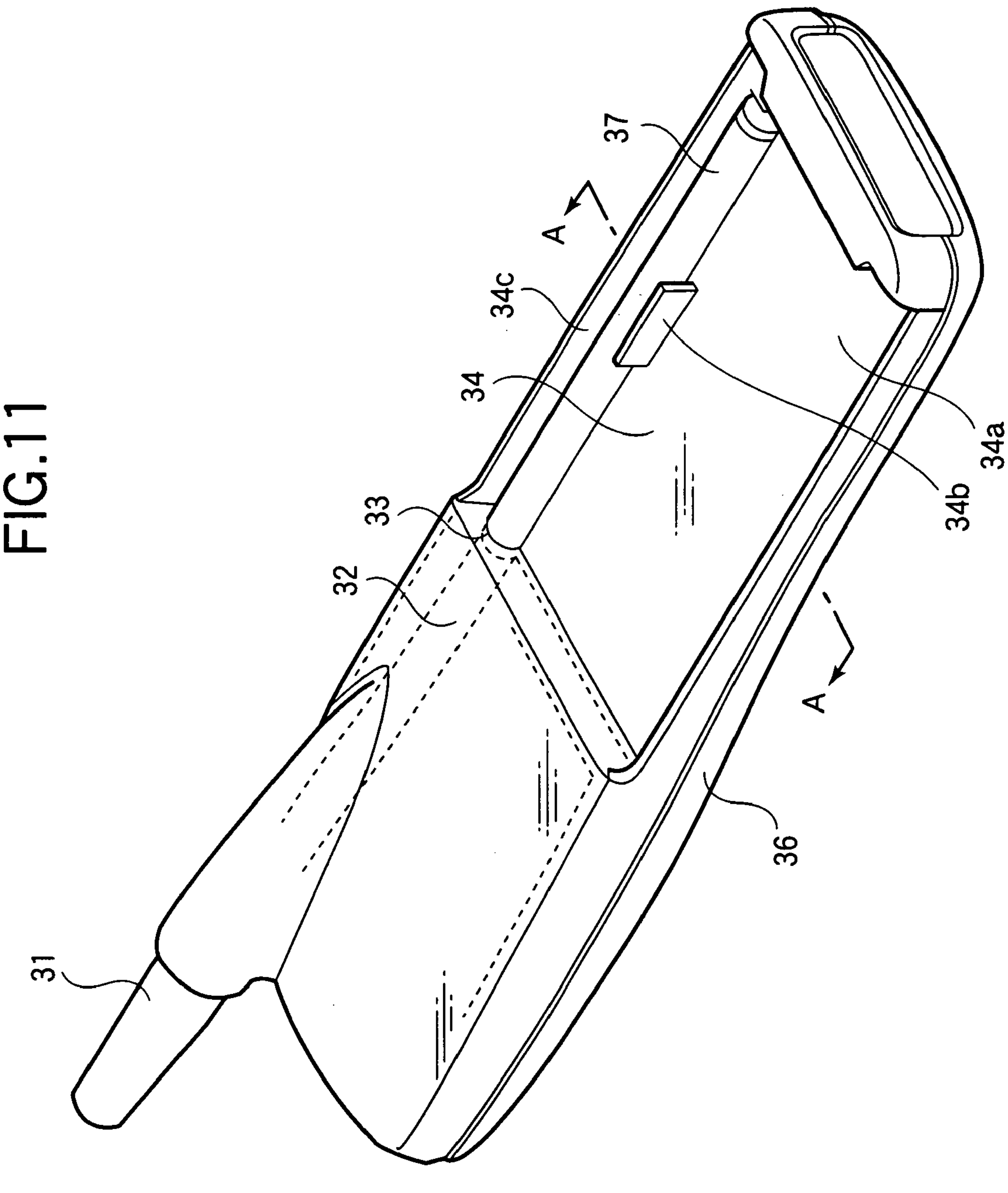
FIG. 11 is a perspective view showing the configuration of a portable phone device according to a conventional embodiment.
Figure 12:
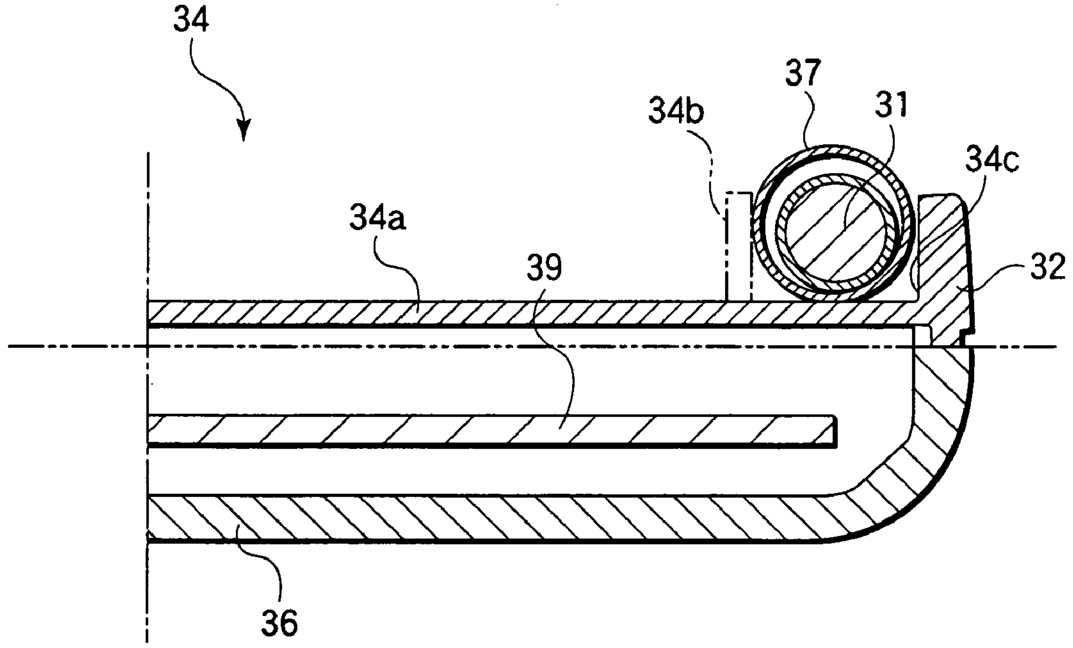
FIG. 12 is a cross-sectional view of the conventional portable phone device.
Figure 13:
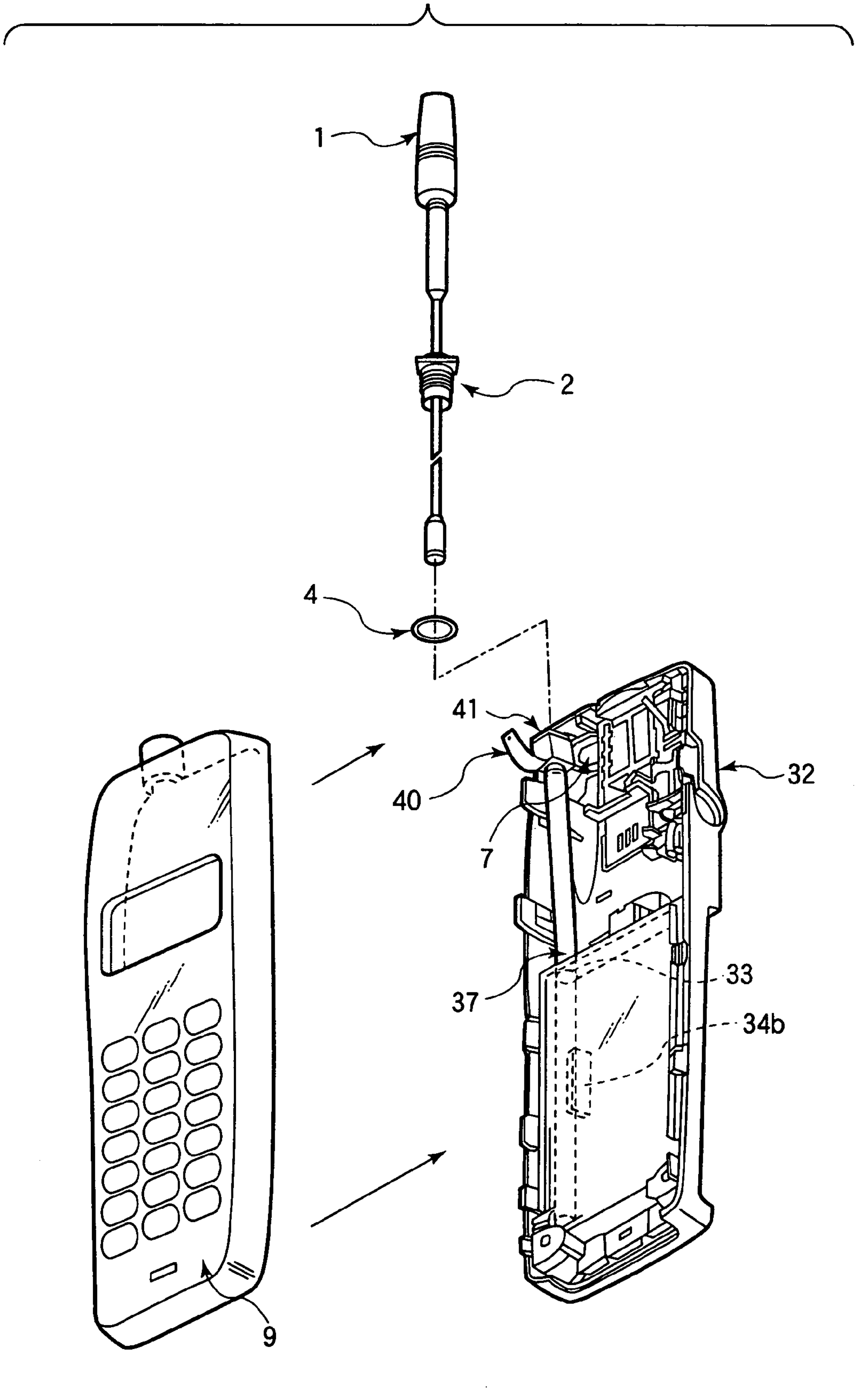
FIG. 13 is an exploded perspective view for explaining the assembly state of the conventional portable phone device.

A fourth embodiment of the invention will be explained with reference to FIGS. 9 and 10. FIG. 9 is a perspective view showing the configuration of a portable terminal device according to the fourth embodiment of the invention, and FIG. 10 is a cross-sectional view taken on the line E—E of FIG. 9. It differs from the third embodiment of the invention in that ribs 15*c*, 15*d*, 15*e* are formed additionally in the half cylindrical gutter-like antenna tube storage part 15 along the antenna storage direction. Accordingly, the rigidity of the device main body can further be improved. All the ribs 15*c*, 15*d*, 15*e* can be provided at the same time, or only one of them can be provided, or a combination thereof can be provided as well.

Although an example of a half cylindrical gutter-like antenna tube storage part has been explained as the antenna tube storage part 15 in the above-mentioned description, as a gutter-like antenna tube storage part, a V-shaped tub or a rectangular tub can be used as well. However, a half cylindrical shape is more preferable in terms of the shaping property and the assembly property.

As mentioned above, since the first aspect of the invention is a portable terminal device with an antenna main body to be stored in an antenna tube in a housing in the case an antenna is contracted, wherein a gutter-like antenna tube storage part is provided in a battery storage part in a rear case of the housing so as to store the antenna main body in the antenna tube provided in the antenna tube storage part, the section modulus of the rear case of the housing in terms of the strength of materials can be large, and thus an effect of preventing deterioration of the rigidity can be achieved even in the case the device main body is made thinner.

Moreover, since the second aspect of the invention is the portable terminal device according to the first aspect, wherein a rib is provided along the antenna storage direction in the antenna tube storage part, the section modulus of the rear case of the housing in terms of the strength of materials can further be large, and thus an effect of preventing deterioration of the rigidity can be achieved even in the case the device main body is made thinner.

Furthermore, since the third aspect of the invention is the portable terminal device according to the first or second aspect, wherein a protrusion part of the gutter-like antenna tube storage part is formed on the battery side in the battery storage part so as to store the antenna tube in a recess part of the antenna tube storage part formed on the opposite side with respect to the battery side, the operation of inserting the antenna tube through the hole provided in the housing can be eliminated at the time of assembly, and thus the assembly property of the device can be improved. Moreover, since the hole for inserting through the antenna tube provided commonly in the conventional housing is eliminated, an effect of avoiding entrance of sweat or water from the battery storage part into the housing inside through the hole can be achieved so as to prevent adverse effects on the electronic parts.

Moreover, since the fourth aspect of the invention is the portable terminal device according to the third aspect, wherein the antenna tube is inserted through between the antenna tube storage part and a printed board, an effect of preventing deterioration of the rigidity even in the case the device main body is made thinner as well as an effect of improving the assembly property of the device can be achieved.

Furthermore, since the fifth aspect of the invention is the portable terminal device according to any of the first to fourth aspects, wherein the antenna tube storage part is a half cylindrical gutter-like antenna tube storage part, an effect of easily forming a shape capable of improving the rigidity as well as an effect of facilitating storage and assembly of the antenna tube in the antenna tube storage part can be achieved.

What is claimed is:

1. A portable terminal device comprising:

a housing with a front case and a rear case;

a battery storage part provided in the rear case;

an antenna;

an antenna tube for storing the antenna; and a gutter-like antenna tube storage part provided in the battery storage part to store the antenna tube, wherein said gutter-like antenna tube storage part forms a recess part on a battery side of the battery storage part and a protrusion part on an opposite side with respect to the battery side, wherein the recess part defines a recessed storage area in communication with the battery side of the battery storage part, wherein a first portion of said antenna tube is stored in the recessed storage area of the recess part of the antenna tube storage part.

2. A portable terminal device according to claim 1, further comprising a rib with an unattached end projecting from the protrusion part of the antenna tube storage part.

3. A portable terminal device according to claim 1, further comprising a rib with an unattached end projecting from an end of the recess part of the antenna tube storage part.

4. A portable terminal device according to claim 2, wherein the tube storage part has an overall elongated length, wherein the rib extends substantially along the entire elongated length of the tube storage part.

5. A portable terminal device according to claim 3, wherein the tube storage part has an overall elongated length, wherein the rib extends substantially along the entire elongated length of the tube storage part.

6. A portable terminal device according to claim 1, wherein the front case includes a first portion, wherein the tube storage part is positioned between the first portion of the antenna tube and the first portion of the front case.

7. A portable terminal device according to claim 6, further comprising a rib with an unattached end projecting from the protrusion part of the antenna tube storage part, wherein the rib is positioned between the tube storage part and the first portion of the front case.

8. A portable terminal device according to claim 6, further comprising a rib with an unattached end projecting from the protrusion part of the antenna tube storage part, wherein the unattached end of the rib projects in a direction toward the first portion of the front case.

9. A portable terminal device according to claim 6, further comprising a rib with an unattached end projecting from an end of the recess part of the antenna tube storage part, wherein the unattached end of the rib projects in a direction away from the first portion of the front case.

10. A portable terminal device according to claim 6, further comprising a first rib with an unattached end projecting from the protrusion part of the antenna tube storage part in a direction toward the first portion of the front case, and a second rib with an unattached end projecting from an end of the recess part of the antenna tube storage part in a direction away from the first portion of the front case.

11. A portable terminal device according to claim 6, wherein the battery storage part is provided in a first portion of the rear case and wherein a second portion of the antenna tube is located between a second portion of the front case and a second portion of the rear case.

12. A portable terminal device according to claim 11, wherein the rear case includes an aperture in communication with the recessed storage area, wherein the antenna tube extends through the aperture.

13. A portable terminal device according to claim 1, further comprising at least one rib provided along an antenna storage direction with a first attached end attached to the antenna tube storage part and a second unattached end projecting from the antenna tube storage part, said second unattached end being opposite said first attached end.

14. A portable terminal device according to claim 13, wherein the at least one rib does not define any portion of the recessed storage area.

15. A portable terminal device comprising:

an antenna;

an antenna tube provided in a housing for storing the antenna;

a gutter-like antenna tube storage part provided in a battery storage part provided in a rear case of the housing to store the antenna in the antenna tube; and at least one rib provided along an antenna storage direction with a first attached end attached to the antenna tube storage part and a second unattached end projecting from the antenna tube storage part, said second unattached end being opposite said first attached end, wherein a protrusion part of the gutter-like antenna tube storage part is formed on a battery side in the battery storage part and a recess part of the antenna tube storage part is formed on an opposite side with respect to the battery side, wherein the recess part defines a recessed storage area in communication with the opposite side, wherein a first portion of the antenna tube is stored in the recessed storage area.

16. A portable terminal device according to claim 15, further comprising a printed board provided under the battery storage part and on the opposite side with respect to the battery side, wherein the first portion of the antenna tube is inserted through between the antenna tube storage part and the printed board.

17. A portable terminal device according to claim 15, wherein the at least one rib comprises a rib provided on the protrusion part of the antenna tube storage part.

18. A portable terminal device according to claim 15, wherein the at least one rib comprises a rib provided on an end of the recess part.

19. A portable terminal device according to claim 15, wherein the at least one rib comprises a first rib provided on the protrusion part of the antenna tube storage part and a second rib provided on an end of the recess part.

20. A portable terminal device comprising:

an antenna;

an antenna tube provided in a housing for storing the antenna;

a gutter-like antenna tube storage part provided in a battery storage part provided in a rear case of the housing to store the antenna in the antenna tube; and at least one rib provided along an antenna storage direction with a first attached end attached to the antenna tube storage part and a second unattached end protecting from the antenna tube storage part, said second unattached end being opposite said first attached end, wherein said gutter-like antenna tube storage part forms a recess part on a battery side of the battery storage part and a protrusion part is formed on an opposite side with respect to the battery side, wherein the recess part defines a recessed storage area in communication with the battery side of the battery storage part, wherein a first portion of the antenna tube is stored in the recessed storage area.

21. A portable terminal device according to claim 20, wherein the housing includes a front case including a first portion and a second portion, wherein the battery storage part is provided in a first portion of the rear case and the antenna tube storage part is positioned between the first portion of the antenna tube and the first portion of the front case, and the antenna tube including a second portion located between the second portion of the front case and a second portion of the rear case.

22. A portable terminal device according to claim 21, wherein the rear case includes an aperture in communication with the recessed storage area, wherein the antenna tube extends through the aperture.

23. A portable terminal device comprising:

an antenna;

an antenna tube provided in a housing for storing the antenna;

a gutter-like antenna tube storage part provided in a battery storage part provided in a rear case of the housing to store the antenna in the antenna tube; and at least one rib provided along an antenna storage direction with a first attached end attached to the antenna tube storage part and a second unattached end projecting from the antenna tube storage part, said second unattached end being opposite said first attached end, wherein the gutter-like antenna tube storage part forms a recess part defining a recessed storage area, wherein a first portion of the antenna tube is stored in the recessed storage area and the at least one rib does not define any portion of the recessed storage area.

24. The portable terminal device according to claim 23, wherein the antenna tube storage part is a half cylindrical gutter-like antenna tube storage part.

* * * * *

UNITED STATES PATENT AND TRADEMARK OFFICE

CERTIFICATE OF CORRECTION

PATENT NO. : 6,944,429 B1

DATED : September 13, 2005

INVENTOR(S) : Kitamura et al.

It is certified that error appears in the above-identified patent and that said Letters Patent is hereby corrected as shown below:

Column 7,

Line 29, please delete “protecting” and insert therefor -- projecting --.

Signed and Sealed this

Twenty-ninth Day of November, 2005

JON W. DUDAS

*Director of the United States Patent and Trademark Office*